(12) United States Patent
Bernard et al.

(10) Patent No.: US 11,193,619 B2
(45) Date of Patent: Dec. 7, 2021

(54) COMPOSITE COMPONENTS

(71) Applicant: Crompton Technology Group Ltd, Solihull (GB)

(72) Inventors: James William Bernard, Brackley (GB); Paul Daniel Liddel, Banbury (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 154 days.

(21) Appl. No.: 16/424,555

(22) Filed: May 29, 2019

(65) Prior Publication Data

US 2019/0368645 A1    Dec. 5, 2019

(30) Foreign Application Priority Data

May 30, 2018   (EP) ...................... 8275073

(51) Int. Cl.
*F16L 55/02*    (2006.01)
*F16L 55/00*    (2006.01)
(Continued)

(52) U.S. Cl.
CPC ............ *F16L 55/00* (2013.01); *B23B 27/02* (2013.01); *B29C 45/14* (2013.01); *B29C 70/02* (2013.01);
(Continued)

(58) Field of Classification Search
CPC .. B32B 5/05; B64C 1/06; F16L 11/124; F16L 11/11; F16L 2201/30; F16L 2201/60;
(Continued)

(56) References Cited

U.S. PATENT DOCUMENTS 3,428,507 A    2/1969  Ball
4,917,938 A *  4/1990  Mohan .................... B29C 70/08
                                                   428/215
(Continued)

FOREIGN PATENT DOCUMENTS

DE          19850462 A1    5/2000
DE       202015006737 U1   10/2015
(Continued)

OTHER PUBLICATIONS

Extended European Search Report for International Application No. 18275073.7 dated Dec. 5, 2018, 8 pages.
(Continued)

*Primary Examiner* — Patrick F Brinson
(74) *Attorney, Agent, or Firm* — Cantor Colburn LLP

(57) ABSTRACT

A fibre-reinforced polymer component is provided which comprises a main portion comprising fibre-reinforced polymer and at least one surface and at least one raised feature extending from said surface. The at least one raised feature consists of non-reinforced polymer and is shaped to incur visually perceptible damage when the component is subject to an impact with an energy above a predetermined impact energy threshold and to resist an impact with an energy below the predetermined impact energy threshold. The at least one raised feature thus provides a clear visual aid as to when a component has experienced an impact with an energy above the impact energy threshold. Because the raised feature consists of polymer without fibre reinforcement, it is more fragile than the fibre-reinforced polymer main portion 204 and thus reduces the energy at which impacts may be detected.

14 Claims, 7 Drawing Sheets

(51) Int. Cl.
*B29C 70/48* (2006.01)
*B29C 70/02* (2006.01)
*B29C 45/14* (2006.01)
*B23B 27/02* (2006.01)
*B32B 27/02* (2006.01)
*B29L 23/00* (2006.01)

(52) U.S. Cl.
CPC .............. *B29C 70/48* (2013.01); *B32B 27/02* (2013.01); *F16L 55/02* (2013.01); *B29L 2023/22* (2013.01)

(58) Field of Classification Search
CPC ........ F16L 11/112; F16L 11/115; F16L 11/15; G01L 5/0052
USPC ........ 138/121, 122, 110, 104; 116/200, 203, 116/208, 212; 428/57, 220; 73/862, 381, 73/762, 849
See application file for complete search history.

(56) References Cited

U.S. PATENT DOCUMENTS

| | | | |
|---|---|---|---|
| 5,108,678 A | 4/1992 | Hirasaka | |
| 5,437,311 A | 8/1995 | Reynolds | |
| 7,281,597 B2 | 10/2007 | Pellillo et al. | |
| 7,565,778 B2 | 7/2009 | Azeau | |
| 8,689,644 B2 * | 4/2014 | Dubost | G01M 5/0033 73/862.381 |
| 8,944,225 B2 | 2/2015 | Wuest et al. | |
| 9,274,036 B2 | 3/2016 | Malik et al. | |
| 9,586,621 B2 | 3/2017 | Fodor | |
| 9,592,853 B2 | 3/2017 | Aitharaje et al. | |
| 9,834,649 B1 | 12/2017 | Kinnan | |
| 10,059,382 B2 | 8/2018 | Nusier et al. | |
| 10,197,392 B2 | 2/2019 | Clark | |
| 10,293,770 B2 | 5/2019 | Owens et al. | |
| 10,309,570 B2 | 6/2019 | Gonzalez Bayon et al. | |
| 2006/0234007 A1 * | 10/2006 | Durand | B64C 3/20 428/122 |
| 2007/0119363 A1 * | 5/2007 | Neto | F16L 11/12 116/208 |
| 2008/0087768 A1 * | 4/2008 | Lloyd | B64C 1/065 244/123.1 |
| 2011/0220006 A1 * | 9/2011 | Kaye | B64C 3/185 116/201 |
| 2013/0108828 A1 * | 5/2013 | Cantrell | B64F 1/005 428/124 |
| 2013/0183087 A1 | 7/2013 | Weibel et al. | |
| 2014/0024741 A1 * | 1/2014 | Strobel | C08L 63/00 523/400 |
| 2015/0102524 A1 | 4/2015 | Hubauer | |
| 2016/0159453 A1 * | 6/2016 | Korenaga | B29C 67/0007 428/57 |
| 2016/0377424 A1 | 12/2016 | Clark | |
| 2017/0100911 A1 | 4/2017 | Kwon et al. | |
| 2017/0173629 A1 * | 6/2017 | Senani | C09D 7/70 |
| 2018/0117859 A1 * | 5/2018 | Carlson | B29C 70/22 |
| 2019/0048962 A1 | 2/2019 | Wuest | |
| 2019/0061309 A1 | 2/2019 | Kwon | |
| 2019/0061310 A1 | 2/2019 | Kwon | |
| 2021/0102855 A1 | 4/2021 | Bernard et al. | |
| 2021/0102862 A1 | 4/2021 | Bernard et al. | |

FOREIGN PATENT DOCUMENTS

| | | |
|---|---|---|
| EP | 1582796 A2 | 10/2005 |
| EP | 2335908 A1 | 6/2011 |
| EP | 3575071 A1 | 12/2019 |
| GB | 2177883 A | 2/1987 |

OTHER PUBLICATIONS

European Search Report for Application No. 19386040.0, dated Mar. 25, 2020, 7 pages.
European Search Report for Application No. 19386041.8, dated Mar. 25, 2020, 7 pages.
Extended European Search Report for International Application No. 18275073.7 dated Dec. 6, 2018, 8 pages.

* cited by examiner

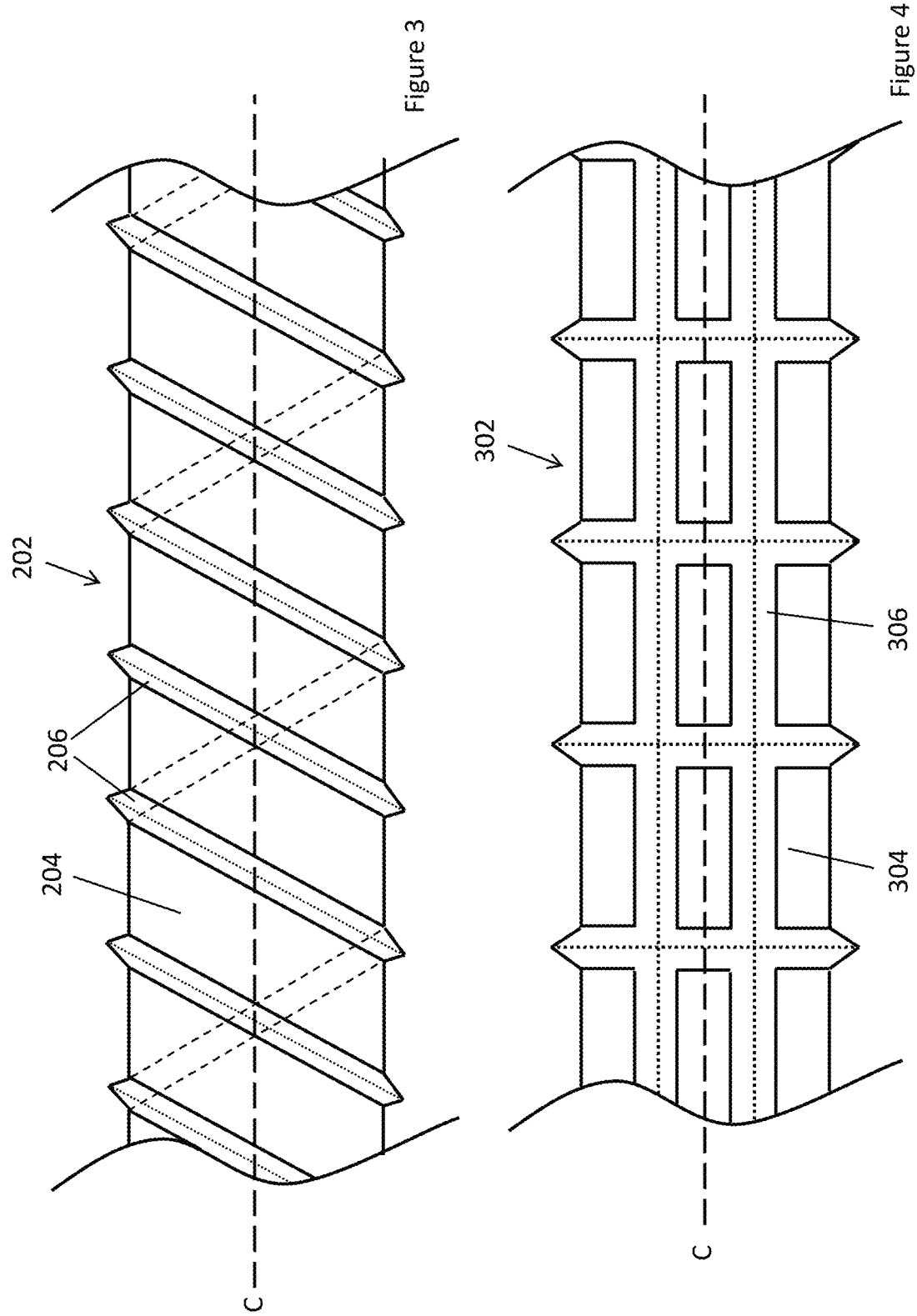

COMPOSITE COMPONENTS

FOREIGN PRIORITY

This application claims priority to European Patent Application No. 18275073.7 filed May 30, 2018, the entire contents of which is incorporated herein by reference.

TECHNICAL FIELD

The present disclosure relates to composite (e.g. fibre-reinforced polymer) components and in particular to techniques of detecting damage to composite components caused by impacts.

BACKGROUND

Composite materials, such as fibre-reinforced polymers, are used in a wide variety of applications where parts with high strength but low mass are required. For example, carbon or glass fibre-reinforced polymer (FRP) composite materials are often used to produce structural components (e.g. struts, connectors), force-transmitting components (e.g. drive shafts, push rods) and fluid transfer conduits (e.g. fuel pipes) in the aerospace and automotive industries. Components suitable for these applications must have high strength to handle the large forces involved, but also need to minimise weight for fuel saving and/or performance reasons.

The material properties of fibre-reinforced polymers mean that damage (such as delamination or broken fibres) caused by relatively low-energy impacts (e.g. a technician dropping a tool onto a part) is often confined to or focused within the internal regions and/or a reverse side (i.e. opposite to the impact) of the composite material. It can therefore be very difficult to visually detect such damage from the front side of the material. Damage which is detectable only by a detailed visual inspection is often referred to as Barely Visible Impact Damage (BVID). Impacts to a composite component with an energy sufficient to cause BVID are therefore the lowest energy impacts that may be detected. However, impacts which do not cause BVID (i.e. impacts of lower energy) can still severely weaken a composite material. With no outwardly visible indication of this weakening on its exterior, these impacts can lead to unexpected failures in components well below the rated performance of a material.

In some cases, BVID can be detected by visually inspecting a reverse side or internal surfaces of composite materials, e.g. the inside surfaces of a composite tube. However, this can be time-consuming and is not always conclusive. In addition, the geometry of some components (e.g. complex pipe geometries) can prevent direct visual inspection of a reverse side or internal surface without inconvenient and time consuming disassembly or the use of specialist tools (e.g. inspection scopes).

As such, composite parts are typically constructed to withstand any impact with an energy below that at which BVID occurs (i.e. to ensure that impacts which cannot be detected do not detract from the performance of the part). In fact, BVID identification and the associated reduction in structural performance at these levels of damage is often the primary factor driving the design of composite materials and components. This can, however, lead to components being strengthened or reinforced beyond that required for their primary function (e.g. a fuel pipe featuring thicker walls than would be required to withstand the pressure of the fuel). This increases the weight and material cost of components.

It is important to be able to detect any damage sustained by a composite part, to protect against unexpected failures or reduced performance. However, it is also desirable to minimise the weight and material cost of composite parts. As such, means of reducing the energy level at which BVID is established for a composite component and improved methods of effectively and reliably detecting BVID are sought.

SUMMARY

From a first aspect of the present disclosure there is provided a fibre-reinforced polymer component. The component includes a main portion comprising fibre-reinforced polymer and at least one surface and at least one raised feature extending from said surface. The at least one raised feature consists of non-reinforced polymer and is shaped to incur visually perceptible damage when the component is subject to an impact with an energy above a predetermined impact energy threshold and to resist an impact with an energy below the predetermined impact energy threshold.

The at least one raised feature thus provides a clear visual aid as to when a component has experienced an impact with an energy above the impact energy threshold. Because the raised feature consists of polymer without fibre reinforcement, it is more fragile than the fibre-reinforced polymer main portion and thus reduces the energy at which impacts may be detected.

Various factors may be taken into account when selecting the predetermined impact energy threshold, such as likely impact exposures and associated probability. In one or more examples, the predetermined impact energy threshold is selected based on the fibre-reinforced polymer of the main portion. For example, the predetermined impact energy threshold may be selected based on one or more properties of the fibre-reinforced polymer. This means that the at least one raised feature can be designed to give a visual indication of damage that is expected to occur in the main portion for impact energies above the threshold, even if such damage is not visually perceptible in the main portion. In preferred examples, the predetermined impact energy threshold may be selected to be an impact energy above which the main portion would suffer severe damage (i.e. damage that negatively influences the component's performance, for example damage which reduces the pressure a composite fluid transfer conduit is able to withstand). Severe damage may be classified as damage that prevents the component from retaining ultimate load capability. In such examples, an impact that would cause severe damage to the main portion appears in the raised feature as visually perceptible damage, while impacts that do not affect the performance of the component do not show up. An inspector can quickly thereby identify the occurrence of such an impact which would otherwise have been very difficult to detect. This can not only speed up inspections but increase their reliability. It will be appreciated that, in one or more examples, the predetermined impact energy threshold may be selected based on the expected use of the component, e.g. because severe damage in one application may not be considered to be severe in another application.

It may, however, be desirable to identify impacts with energies below that which would individually cause severe damage to the main portion. In some examples therefore the predetermined impact energy threshold may be selected to be an impact energy below that at which the main portion would incur severe damage.

The raised feature thus reduces the energy level at which BVID is established. However, the raised feature may be shaped to provide such a clear visual indicator that a formal inspection (typically required to detect BVID levels of damage) is not required to detect the occurrence of an impact (i.e. the damage sustained is more visible than BVID levels of damage). Damage may instead be spotted during normal handling or maintenance of the component, reducing the time and resources required to maintain confidence in the integrity of the component. This enables impact damage to be detected earlier (i.e. between periodic inspections), reducing the time a potentially compromised component is used for.

In addition to providing an indicator that an impact has taken place (which may not have been witnessed) at some previous point in time, the raised feature also provides an immediate indication of impact severity on occasions when an impact is observed. If, for example, a technician drops a tool onto the fibre-reinforced polymer component during maintenance, he can quickly inspect the at least one raised feature for damage, which would indicate that the impact had been greater than the impact energy threshold. If the impact is lower than the impact energy threshold, the raised feature resists the impact and no such damage is visible. The severity of the impact and thus the damage to the component can thereby be quickly ascertained without having to undertake a thorough, time-consuming inspection.

Being able to quickly and reliably detect impact damage can lead to significant time and resource savings, as well as increasing the safety and reliability of composite parts, as a damaged component can be immediately identified for repair or replacement before further use.

The predetermined impact energy threshold may be measured using standard test methods, for example ASTM D7136/D7136M-15 "Standard Test Method for Measuring the Damage Resistance of a Fiber-Reinforced Polymer Matrix Composite to a Drop-Weight Impact Event". This test method determines the damage resistance of multidirectional polymer matrix composite laminated plates subjected to a drop-weight impact event. One or more of the impactor shape, impact energy, and support conditions for the sample under test, may be selected to represent expected impact threats that a given component might suffer in service.

In one or more examples, the visually perceptible damage incurred by the at least one raised feature may comprise a minor abnormality of the raised portion, such as a dent or a chip. In one or more examples, the visually perceptible damage incurred by the at least one raised feature may comprise a noticeable indentation, notch, fracture or crack. In one or more examples, the visually perceptible damage incurred by the at least one raised feature may comprise an entire missing section of the at least one raised portion or indeed a complete absence of the at least one raised portion. Minor blemishes to the at least one raised feature, such as scratches, scuffs or abrasions, may not constitute visually perceptible damage. Preferably, visually perceptible damage is detectable by a human inspector without the use of tools (e.g. magnifying glass or microscopy). A raised feature is understood to resist an impact when there is no such visually perceptible damage.

The inventors have recognised that the shaping, e.g. shape and size, of the at least one raised feature can be adjusted to control the type of damage incurred for a given impact energy and the impact energy to which it is resistant. This means that the shaping of the at least one raised feature can be selected to determine the impact energy above which the raised feature incurs visually perceptible damage. In some examples, therefore, the at least one raised feature comprises a cross-sectional profile that is selected to ensure the at least one raised feature resists impacts with an energy below the impact energy threshold whilst reliably incurring visually perceptible damage when subject to an impact with an energy above the impact energy threshold.

Examples of some cross-sectional profiles which may be used include triangular, rectangular, polygonal, curved, etc. In various examples, the dimensions and/or aspect ratio of a given cross-sectional profile may be adjusted to change the impact resistance of the at least one raised feature and hence the impact energy threshold above which visually perceptible damage is incurred.

The at least one raised feature may cover only a small fraction of the surface of the main portion by area, e.g. up to 30%, up to 20%, or even 10% or less. For example, the at least one raised feature may comprise a narrow ridge. However, even in examples where the at least one raised feature does not cover a large fraction of the surface of the main portion by area, effective impact detection can still be achieved so long as areas of the surface between the raised feature(s) are sufficiently small.

The inventors have recognised that the at least one raised feature covering only a fraction of the surface of the main portion by area can improve the ability of the at least one raised feature to detect impacts and reduce component cost when compared to providing the at least one raised feature as a complete layer of non-reinforced polymer (i.e. with close to 100% coverage). The sensitivity of such a complete layer cannot easily be made as high as that of a distinct raised feature, for example, a ridge (i.e. the predetermined impact energy threshold cannot be made as low). Furthermore, adjusting the sensitivity of a component comprising a complete sacrificial layer might require adjusting the thickness of said layer (as opposed to, for example, adjusting the dimensions/profile of a raised feature as described above). It would be difficult therefore to adjust the sensitivity of a component with a required overall thickness (i.e. of the main portion and the at least one raised portion combined) without having also to alter the thickness of the main portion, with the associated impact on design costs and structural performance.

In addition, there are additional manufacturing challenges involved in producing a consistent and uniform layer (i.e. with uniform thickness), increasing the cost of production.

For example, if the component is to be used in an environment where any impact is likely to be caused by relatively large impact objects (e.g. a spanner), the at least one raised feature does not need to cover the entire surface of the main portion without interruption. Instead, the at least one raised feature needs only to be present on the surface to the extent that an impact to the component caused by a given impact object would necessarily or highly likely hit (and thus damage, if the energy were high enough) the raised feature. A type and/or source of impact to which a component is likely to be subject may thus be considered when selecting how the at least one raised feature is shaped, e.g. its shape, size and/or layout on the surface of the main portion.

The at least one raised feature may comprise a raised pattern which extends across some, most, or all, of the surface of the main portion. In one or more examples, the main portion comprises a cylindrical surface extending along a central axis and the at least one raised feature comprises a narrow ridge on the cylindrical surface that extends in a helix around the central axis. The angle at which the helix extends may be selected such that an axial spacing between passes of the ridge is smaller than a smallest dimension of a probable impact object.

In some examples, the at least one raised feature provides uniform coverage over substantially the entire surface of the main portion, such that impacts at any location on the surface may be detected.

The at least one raised feature may comprise a plurality of raised features. In some examples, different raised features may extend from different areas of the surface of the main portion. In some examples, different raised features may extend from different surfaces of a plurality of surfaces to provide a different impact resistance to different sections of the main portion. Preferably, the plurality of raised features are arranged across the at least one surface of the main portion and are spaced apart by a spacing distance. The spacing distance may be regular or irregular and it may be chosen depending on an impact source as described above.

A plurality of different raised features (i.e. features sensitive to different impact energy thresholds) may be provided in one area of the at least one surface to provide more information about the energies of impacts. In one or more examples, the plurality of raised features comprises at least two different raised features. The at least two different raised features may be different types of raised features, for example one type having a triangular cross-sectional profile and another type having a rounded cross-sectional profile. For example, high sharp peaks (with a low impact energy threshold) may be separated by lower rounded peaks (with a much higher impact energy threshold) to impacts to be categorized by energy (i.e. an impact which results in visually perceptible damage to high sharp peaks but not to collocated lower rounded peaks must have an energy falling between the respective thresholds of the two types of peak).

The inventors have recognised that the material of the at least one raised feature may be selected to help control the type of damage incurred for a given impact energy and the impact energy to which it is resistant. In some examples, the non-reinforced polymer of the raised feature(s) may be the same polymer as the fibre-reinforced polymer of the main portion. As is discussed below, this can simplify manufacture of the component by using the same resin system. In other examples, the non-reinforced polymer of the raised feature(s) may be a different polymer to the fibre-reinforced polymer of the main portion. In such examples, the raised feature(s) may be moulded onto one or more surfaces of the main portion.

While it is important that the at least one raised feature consists of non-reinforced polymer, there may be negligible amounts of fibre reinforcement materials present—but only to the extent that they have a negligible impact upon the structural properties of the at least one raised feature. For instance, the raised feature may comprise a trivial quantity of fibre reinforcement that has unintentionally spread from the main portion during manufacture of the component.

Aside from unintentionally included fibre reinforcement materials, the non-reinforced polymer of the at least one raised feature may optionally include one or more non-fibre material additives. For example, the non-reinforced polymer of the at least one raised feature may include small quantities of one or more non-fibre material additives intended to alter one or more non-structural properties of the polymer, such as viscosity, thermal or electrical conductivity, radiation sensitivity, colour, fire or chemical resistance etc.

For example, in some applications of composite materials, such as fibre reinforced polymer pipes within aircraft fuel systems, it is important to control the conductivity of the composite component. Ideally the fuel pipes are insulating enough to avoid becoming the preferred path for lighting conduction, whilst conductive enough to avoid static build-up due to fuel flow. Adding a particular amount of a conductive additive (e.g. carbon black) to the polymer during manufacture allows the desired level of conductivity to be achieved. Such an additive is ideally present throughout the component (i.e. in both the main portion and the at least one raised feature). In at least some examples of the present disclosure, the composite component is a fluid transfer conduit such as a fuel pipe.

In some examples the at least one raised feature comprises an outer coating with a colour which is contrasting with a colour of the non-reinforced polymer (e.g. the non-reinforced polymer may be black due to the addition of a carbon black additive, while the coating is white). This may enable any damage to the at least one raised feature to be more readily identified, as underlying polymer exposed due to damage incurred by the at least one raised feature would contrast with the intact coating surrounding the damaged area.

The present disclosure extends to a method of manufacturing a fibre-reinforced polymer. The method includes: moulding a main portion comprising fibre-reinforced polymer and at least one surface; and moulding at least one raised feature to extend from said surface. The at least one raised feature consists of non-reinforced polymer and is shaped to incur visually perceptible damage when the component is subject to an impact with an energy above a predetermined impact energy threshold and to resist an impact with an energy below the predetermined impact energy threshold.

As is described above, the raised feature can be shaped so as to be more sensitive to impact damage than the main portion, thereby making it easier to visually detect when damage has occurred.

In some examples, the non-reinforced polymer of the raised feature(s) may be a different polymer to the fibre-reinforced polymer of the main portion. Preferably the raised feature(s) are added to the main portion by a manufacturing process that results in good adherence therebetween, so that the raised feature(s) are not simply knocked off by an impact. Preferably the raised feature(s) are not just glued onto a surface of the main portion. Preferably the raised feature(s) are integrated with the main portion by a suitable manufacturing process.

In a first set of examples, the raised feature(s) may be moulded onto one or more surfaces of the main portion. The method may therefore comprise over moulding at least one raised feature to extend from said surface. In at least some examples, in addition or alternatively, the method may comprise moulding one or more structural features on said surface. Such structural features may be flanges or other fastening parts. It may be convenient for the raised feature(s) to be moulded onto one or more surfaces of the main portion at the same time as over moulding the structural feature(s).

In a second set of examples, the raised feature(s) may be moulded together with the main portion. In such examples, the method may comprise: providing a mould comprising a primary region and at least one groove extending from said primary region; placing a first polymer material into the at least one groove; placing fibre reinforcement into the primary region such that it does not extend into the at least one groove; and introducing a second polymer material to the mould such that it penetrates into the primary region and the fibre reinforcement to produce the main portion with at least one surface formed by the primary region and to produce the at least one raised feature consisting of the first polymer extending from said surface. By using a mould having at least one groove, the groove(s) can be shaped to dictate the shape of the resulting raised feature(s).

In at least some such examples, the at least one groove may be pre-filled with the first polymer material before introducing the second polymer to the mould. The first polymer material may be uncured, part cured or fully cured before introducing the second polymer that forms the matrix material for the fibre-reinforced main portion. The method may further comprise curing the fibre-reinforced polymer component after introducing the second polymer material to the mould.

In other examples, the non-reinforced polymer of the raised feature(s) may be the same polymer as the fibre-reinforced polymer of the main portion. Using the same polymer resin throughout the component may assist with compliance. Furthermore, the manufacturing process can be simplified as the same polymer material may be used to mould the main portion and the raised feature(s) at the same time. In a preferred set of such examples, the method may comprise: providing a mould comprising a primary region and at least one groove extending from said primary region; placing fibre reinforcement into the primary region such that it does not extend into the at least one groove; and introducing a polymer material to the mould such that it penetrates into the primary region, the fibre reinforcement and the at least one groove to produce a fibre-reinforced polymer component; wherein the main portion comprises fibre-reinforced polymer and at least one surface formed by the primary region, and the at least one raised feature extending from said surface consists of non-reinforced polymer.

As mentioned above, using a mould having at least one groove means that the groove(s) can be shaped to dictate the shape of the resulting raised feature(s). It will be appreciated that this method allows conventional resin infusion techniques to be used to manufacture a fibre-reinforced polymer component with improved impact detection capabilities in a single process. The raised feature is formed integrally with the main portion rather than being added in a subsequent process, which enables impact damage to the main portion to be detected from the moment of manufacture. This is in contrast to conventional damage detection coatings added after manufacture, where impacts occurring between manufacture and the coating being added (e.g. during handling) may not be detected.

Fibre reinforcement in the primary region placed adjacent to the at least one groove may be placed such that it is oriented perpendicular to a direction of the groove, to reduce the likelihood of any fibre reinforcement being accidentally introduced into the groove(s) e.g., when introducing the polymer material or during other manufacturing steps.

In various examples, the method may further comprise applying a vacuum to the mould to draw the polymer material through the mould, or at least through the primary region of the mould. This can increase the speed at which the polymer material penetrates into the primary region and the fibre reinforcement, and optionally into the at least one groove. It may also improve the uniformity of the finished component.

Additionally or alternatively, the polymer material(s) may be introduced into the mould under pressure, i.e. actively pumped into the mould. Similarly to applying a vacuum, this can speed the process up and/or improve the uniformity of the finished component.

Additionally or alternatively, the method may further comprise curing the fibre-reinforced polymer component.

The inventors have recognised that at least some of the exemplary method disclosed herein are particularly suited to resin transfer moulding (RTM), in which the mould comprises a rigid mould which entirely envelops the primary region (e.g. upper and lower moulds which define the primary region when brought together). The at least one groove may be provided on any surface of the rigid mould and thus, because in RTM processes the mould entirely envelops the primary region, raised features may be produced on any external surface of the resulting component. In addition, an RTM process provides a high quality tool-surface finish on all external surfaces of the component.

The method may, however, also be implemented with other mould-based resin infusion techniques such as those in which a rigid mould is used in conjunction with a vacuum bag (as in vacuum infusion processes such as SCRIMP, RIFT and VARTM).

As mentioned above, in some examples the fibre-reinforced polymer component may include one or more non-fibre material additives in the main portion and/or raised feature(s). This may be achieved by adding at least one non-fibre material additive to the polymer material(s) before it is introduced to the mould e.g. such that it is suspended within the polymer material.

BRIEF DESCRIPTION OF THE DRAWINGS

FIG. 3 shows a fibre-reinforced polymer pipe according to an example of the present disclosure;

FIG. 4 shows a fibre-reinforced polymer pipe according to another example of the present disclosure;

DETAILED DESCRIPTION

Figure 1:
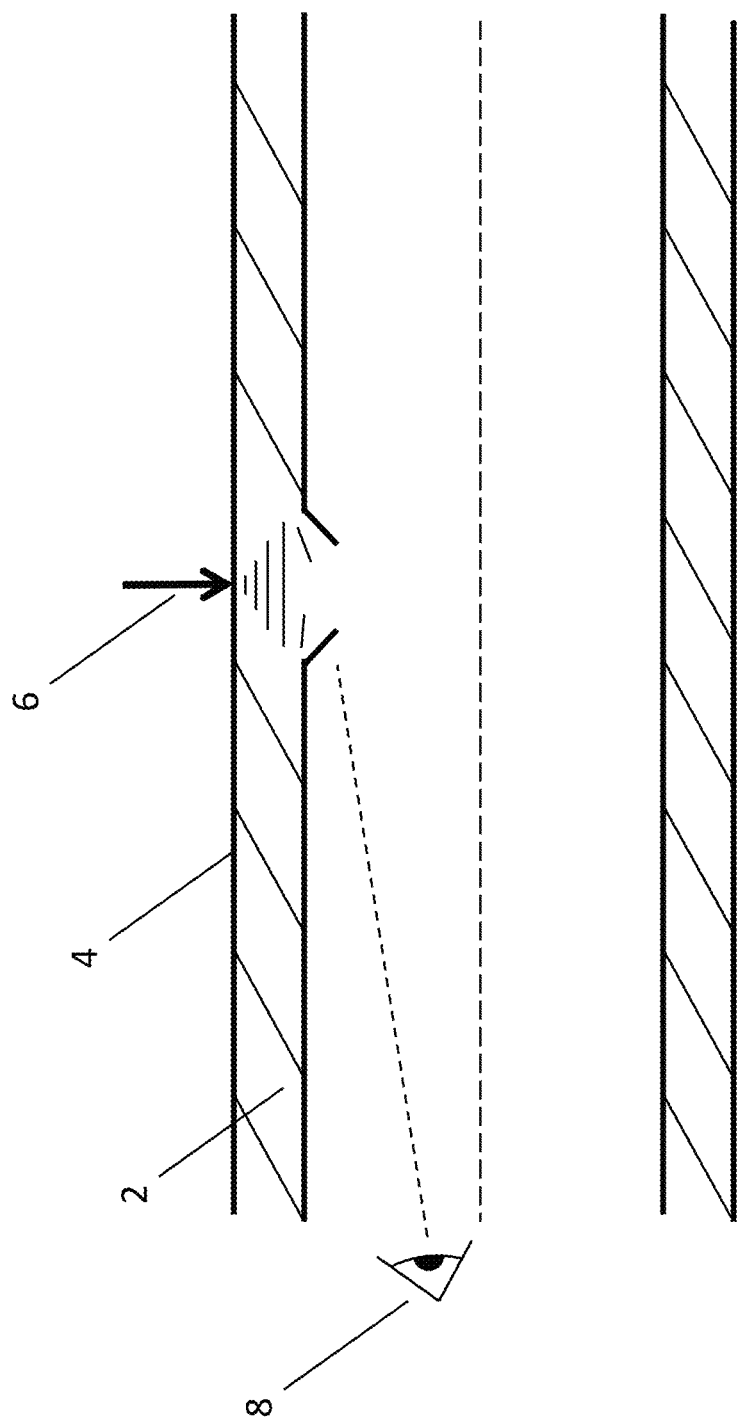
FIG. 1 schematically illustrates the effect of BVID on a cylindrical composite pipe.

FIG. 1 shows in cross-section a composite pipe 2 which has been subject to an impact on an outside surface 4 of the pipe 2 at an impact point 6. The impact has caused little damage to the outside surface 4 but has caused severe damage to the internal structure of the pipe e.g. has caused one or more constituent layers of the composite pipe 2 to fracture. This internal damage is visible to an inspector 8 looking along the inside of the pipe 2. If the inspector 8 judges the damage to be bad enough, the pipe 2 may be quickly taken out of service for repair or replacement. If the damage is within acceptable limits, the pipe 2 may continue to be used.

Figure 2:
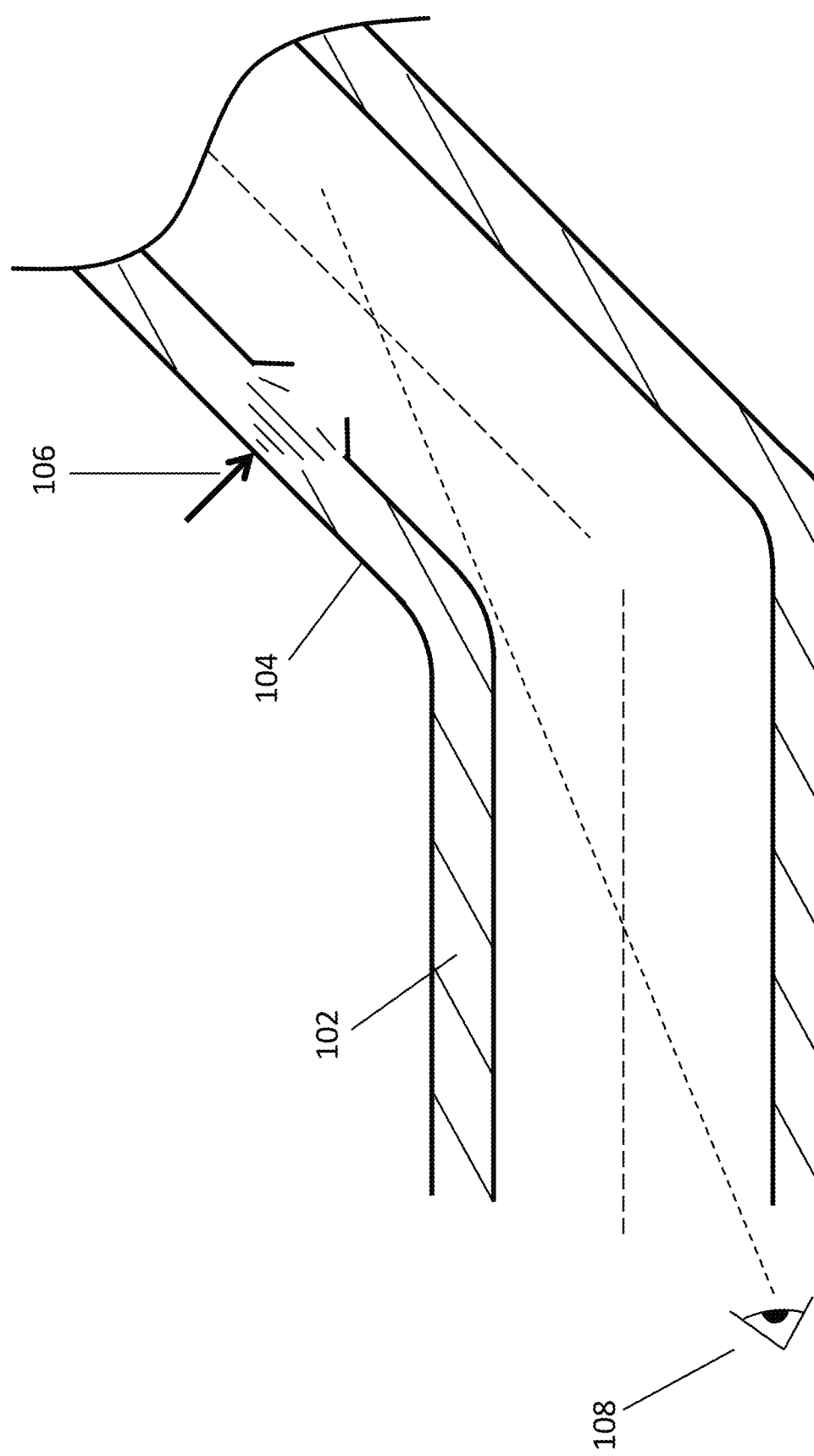
FIG. 2 schematically illustrates the effect of BVID on a composite pipe with a bend.

FIG. 2 shows in cross-section another composite pipe 102 which has also been subject to an impact on an outside surface 104 of the pipe 102 at an impact point 106. Again, the impact has caused little damage to the outside surface 104 but has caused significant damage to the internal structure of the pipe 102. Unlike the pipe in FIG. 1 however, the composite pipe 102 comprises a bend such that the damage caused by the impact is not visible to an inspector 108 looking along the inside of the pipe 102.

As the damage is not visible to the inspector 108 it is not possible to evaluate its magnitude, extent or even its presence. If the impact was witnessed (i.e. the inspector knows there is some damage, but is unsure of its extent) the pipe 102 must either be retired out of an abundance of caution (which may be entirely unnecessary), or further time and resource-intensive investigation must be undertaken to properly assess the damage (e.g. using an inspection scope).

Alternatively, damage caused by a non-witnessed impact would only be detected by a thorough and resource-intensive investigation. As a result, such damage may go undetected for some time (i.e. between scheduled inspections), possibly leading to reduced performance or component failure.

FIG. 3 shows a side view of a fibre-reinforced polymer pipe 202 according to an example of the present disclosure. The pipe 202 comprises a main portion 204 which extends along a central axis C and two raised features 206, which extend from an outer surface of the pipe 202 and continue in a helix along the outer surface of the pipe 202 around the central axis C. Dashed lines are used to indicate the path of one of the raised features 206 on the reverse side of the pipe 202.

The main portion 204 is constructed from fibre-reinforced polymer (e.g. carbon fibre-reinforced polymer, CFRP). This provides the main portion 204 with high strength and resilience, but also means that an impact to the outer surface 202 may cause significant damage to the internal layers of main portion 204 without leaving a visually perceptible indication on the outer surface 202.

The raised features 206, however, consist only of polymer with no fibre reinforcement. The raised features 206 may be made from the same polymer as in the main portion or a different polymer. At least due to the lack of fibre reinforcement, the raised features 206 are, therefore, more fragile than the main portion 204. As a result, when the pipe 202 is subject to an impact above a threshold impact energy, the raised features 206 incur visually perceptible damage even when the main portion 204 may not. By appropriate design of the raised features 206, the threshold energy above which the raised features 206 are "sensitive" (i.e. when visually perceptible damage is incurred) is selected to be an energy at which impacts would cause severe damage (i.e. damage that impacts the pipe's performance) to the main portion 204. Impacts below this energy do not cause visible damage to the raised features 206 but also do not cause substantial damage to the main portion 204. As such, the exterior of the pipe 202 (whatever its internal geometry) can quickly reveal evidence of severe damage-causing impacts while insignificant impacts are not recorded. The presence and magnitude of impact damage to the pipe 202 can therefore be assessed quickly without requiring an in-depth investigation. Visually perceptible damage to the raised features 206 may, for example, comprise a portion (or the entirety) of the raised feature 206 breaking off. It may alternatively comprise a dent or other significant deformation.

The shape and/or layout of the raised features 206 are carefully selected to give them the required sensitivity. As will be discussed in more detail below, with reference to FIGS. 5-9, the cross-sectional profile of the features 206 may be selected to give the features 206 a certain level of impact resistance. The raised features 206 of FIG. 3 have a triangular cross-sectional profile similar to that shown in FIG. 5.

FIG. 4 shows a side view of a fibre-reinforced polymer pipe 302 according to another example of the present disclosure. The pipe 302 comprises a main portion 304 which extends along a central axis C and raised features 306 which extend from an outer surface of the pipe 302 and continue in a crosshatched pattern along the pipe 302.

Again, the main portion 304 is constructed from fibre-reinforced polymer while the raised features 306 consist only of polymer, with no fibre reinforcement. Similarly to those shown in FIG. 3, the raised features of FIG. 4 comprise a triangular cross-sectional profile. However, as mentioned above, many different profiles of raised feature may be utilised to give the raised features a desired impact resistance/sensitivity.

Figure 5:
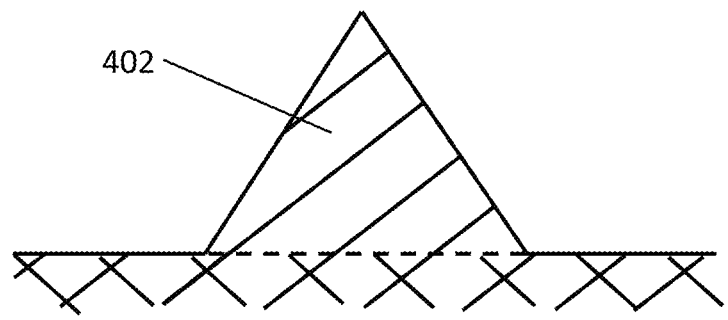
FIGS. 5-9 are cross-sectional views of a variety of raised features on a fibre-reinforced polymer component according to the present disclosure.

FIG. 5 shows a magnified cross-sectional view of a raised feature 402 with a triangular cross-sectional profile, similar to that of the raised features 206, 306 shown in FIGS. 3 and 4.

Figure 6:
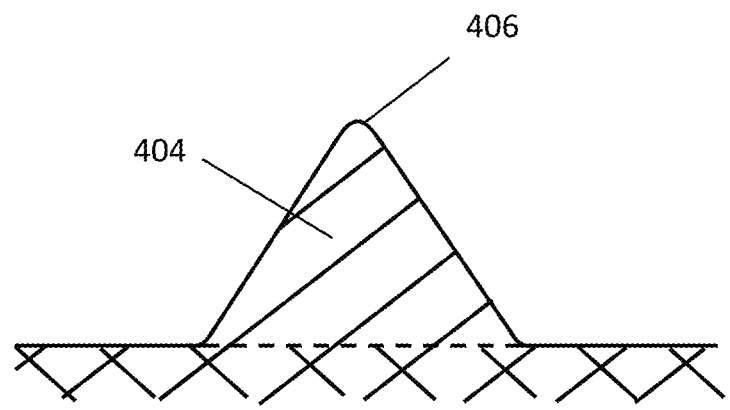

FIG. 6 shows a raised feature 404 with a triangular cross-sectional profile, similar in dimensions to that shown in FIG. 5. Unlike the raised feature 402 of FIG. 5, however, the raised feature 404 has a rounded point 406. The point of the triangle is the most sensitive (i.e. fragile) portion of the raised feature and as such this minor alteration can have a large effect on the resultant sensitivity/impact resistance of the raised feature 404. The rounded point 406 lowers the sensitivity of the raised feature 404 (i.e. it increases the energy of impacts to which it is resistant), as the point 406 is less susceptible to breaking off or being damaged than a non-rounded version.

Figure 7:
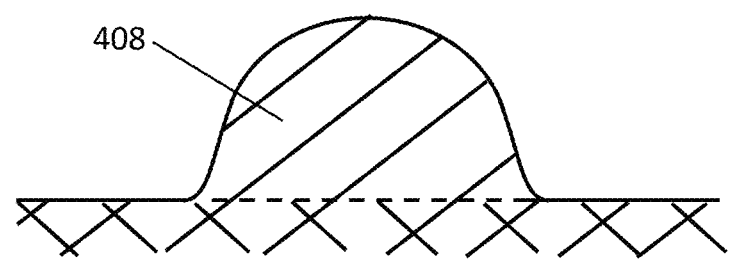

FIG. 7 shows a raised feature 408 with a curved cross-sectional profile. The lack of sharp corners gives this shape high impact resistance/low sensitivity.

Figure 8:
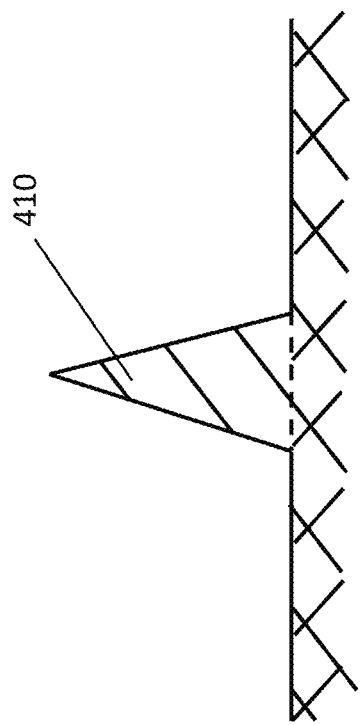

As well as the overall profile shape, the dimensions of a given profile shape may also be adjusted to modify its sensitivity. FIG. 8 shows a raised feature 410 with a triangular cross-sectional profile similar to that shown in FIG. 5. However, the base of the raised feature 410 is much narrower than that of the raised feature 402 shown in FIG. 5. This makes the raised feature 410 more fragile and susceptible to damage and thus sensitive to impacts of lower energy.

Figure 9:
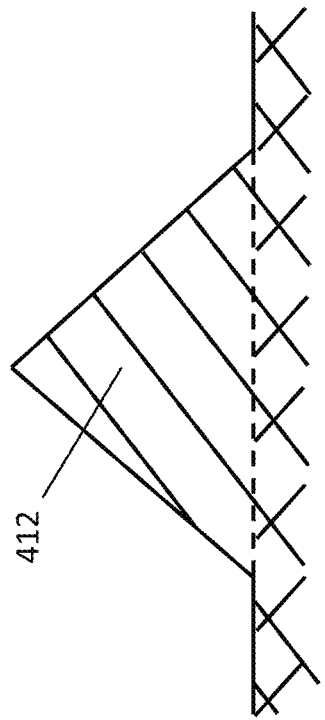

In contrast, FIG. 9 shows a raised feature 412 that has a triangular cross-section with a very wide base. This decreases its sensitivity.

An exemplary method of manufacturing a fibre-reinforced polymer component according to an example of the present disclosure will now be described with reference to FIGS. 10-15. The exemplary method utilises a RTM technique.

Figure 10:
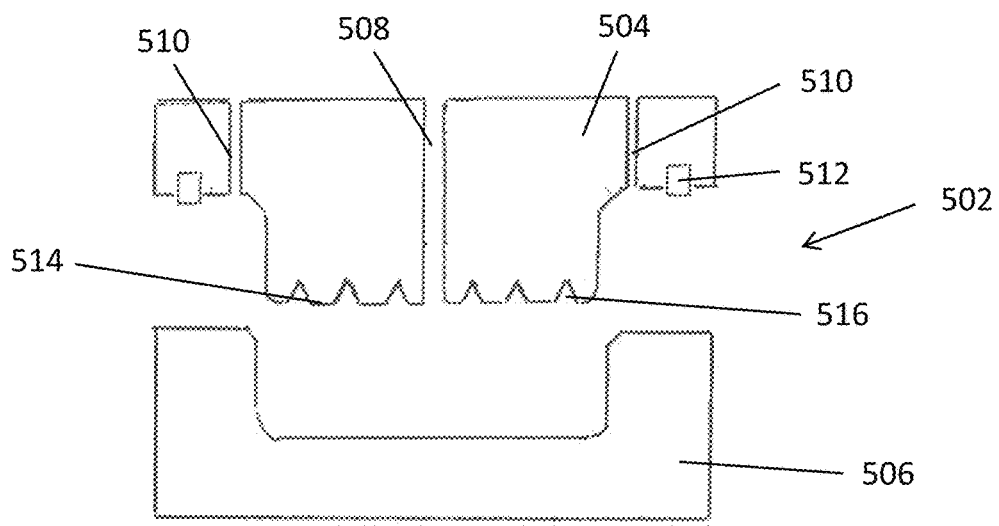
FIGS. 10-15 illustrate a method of manufacturing a fibre-reinforced polymer component according to an example of the present disclosure.

As seen in FIG. 10, a two-part mould 502 comprises an upper mould 504 and a lower mould 506. The upper mould 504 comprises an input channel 508, two vent channels 510 and a seal 512.

The upper mould 504 comprises an upper tool surface 514 and the lower mould 506 comprises a lower tool surface 516. A primary region of the mould 502 is generally formed between the upper and lower moulds 504, 506 when they are brought together. The upper tool surface 514 comprises a plurality of grooves 516 extending from the primary region. While in this example the grooves 516 comprise a triangular cross-sectional profile (similar to that shown in FIG. 5), the upper mould 504 may be produced with grooves 516 of any profile, to produce a composite component with raised features having a desired impact resistance.

Figure 11:
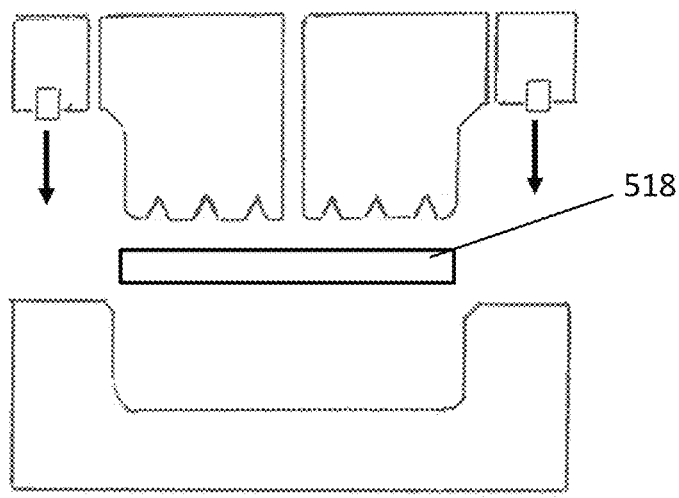
Figure 12:
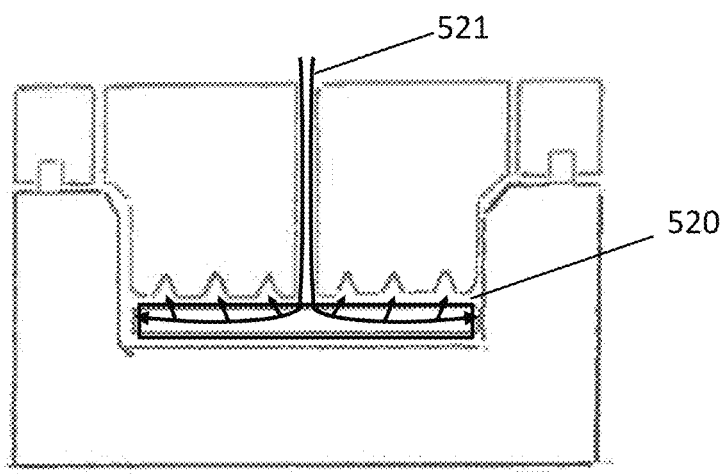

As shown in FIGS. 11 and 12, a preform 518 consisting of fibre reinforcement with a rectangular cross-section is placed into the two-part mould 502 and the mould 502 is closed by bringing the upper mould 504 and the lower mould 506 together. This traps the preform 518 in a primary mould region 520 between the upper and lower moulds 504, 506. The preform 518 holds its rectangular shape such that none of the fibre reinforcement extends out of the primary mould region 520 into the grooves 516 of the upper mould 504. The mould 502 is clamped shut and the seal 512 seals the interface between the upper and lower moulds 504, 506. Optionally, a polymer material may be introduced into the grooves 516 before closing the mould 502, for example when it is desired to make a composite component having raised features that consist of a different polymer to the main portion.

A vacuum is applied to the vent channels 510 and a polymer material e.g. resin 521 is injected under pressure into the mould 502 through the input channel 508. The combination of injection under pressure, and the vacuum applied to the vent channels 510, draws the resin 521 through the mould 502, such that it penetrates both into the fibre reinforcement preform 518 and into the grooves 516 (unless they have already been prefilled). The polymer resin 521 may optionally contain a conductive additive (e.g. carbon black).

Figure 13:
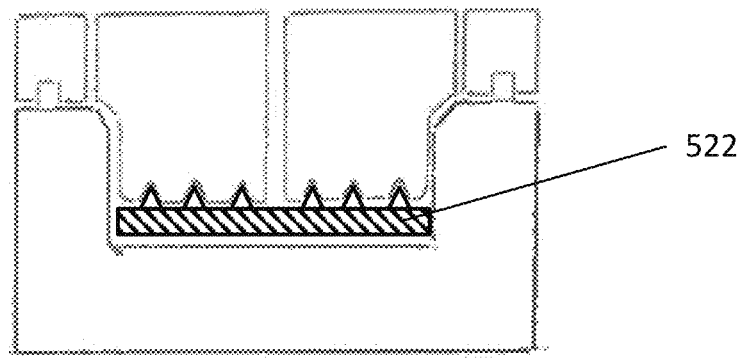
Figure 14:
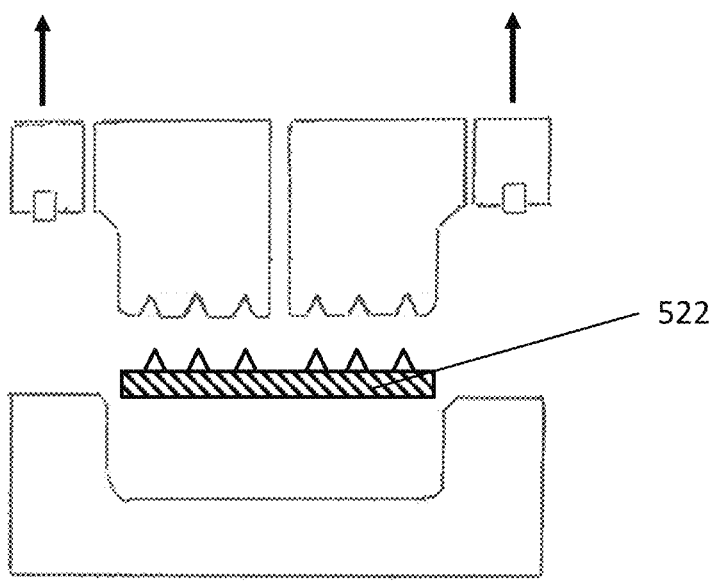
Figure 15:
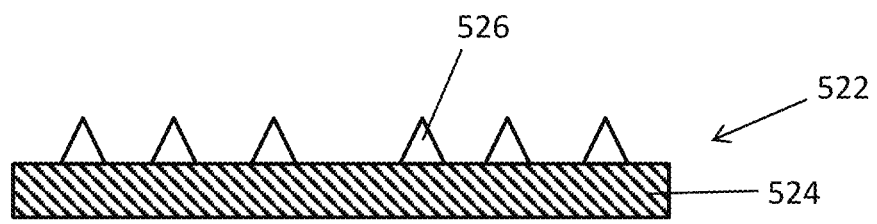

Heat is then applied to the mould 502 to cure the polymer resin 521. This causes the "wetted-out" preform 518 and grooves 516 to set into, as shown in FIG. 15, a solid composite component 522 comprising a main fibre-reinforced portion 524 and non-reinforced triangular raised features 526 having a shape formed by the grooves 516. In examples where the grooves 516 are not prefilled, the raised features 526 are produced by the polymer resin 521 flowing into the grooves 516 (in which there was no fibre reinforcement). As seen in FIGS. 13, 14 and 15, the mould 502 is unclamped and opened and the resulting composite component 522 is removed. The composite component 522 may optionally be further treated to improve damage identification. For example, the raised features 526 may be given an outer coating having a colour which is contrasting with a colour of the underlying non-reinforced polymer (e.g. the non-reinforced polymer may be black due to the addition of a carbon black additive, while the coating is white). This may enable any damage to the raised features 526 to be more readily identified.

In addition, or alternatively, an over moulding process may be used to form one or more raised features and/or one or more structural features on a surface of the main portion.

FIGS. 10-15 depict a method for producing a composite component with a simple planar structure, but the techniques described could be equally applied to produce other structures with more complex shapes, for example curved surfaces or hollow pipes.

The invention claimed is:

1. A fibre-reinforced polymer pipe comprising:
   a main portion comprising fibre-reinforced polymer and a cylindrical surface extending along and around a central axis of the fibre-reinforced polymer pipe; and
   at least one raised feature extending from said cylindrical surface, the at least one raised feature extending across the cylindrical surface;
   wherein the at least one raised feature consists of non-reinforced polymer and is shaped to incur visually perceptible damage when the fibre-reinforced polymer pipe is subject to an impact with an energy above a predetermined impact energy threshold and to resist an impact with an energy below the predetermined impact energy threshold.

2. A fibre-reinforced polymer pipe as claimed in claim 1, wherein the predetermined impact energy threshold is selected based on the fibre-reinforced polymer of the main portion.

3. A fibre-reinforced polymer pipe as claimed in claim 1, wherein the predetermined impact energy threshold may be selected to be at or below an impact energy at which the main portion would incur damage that would prevent the fibre-reinforced polymer pipe from retaining ultimate load capability.

4. A fibre-reinforced polymer pipe as claimed in claim 1, wherein the at least one raised feature comprises a cross-sectional profile that is selected to ensure the at least one raised feature resists impacts with an energy below the impact energy threshold whilst reliably incurring visually perceptible damage when subject to an impact with an energy above the impact energy threshold.

5. A fibre-reinforced polymer pipe as claimed in claim 1, wherein the at least one raised feature comprises a triangular cross-sectional profile.

6. A fibre-reinforced polymer pipe as claimed in claim 1, wherein the at least one raised feature comprises a curved cross-sectional profile.

7. A fibre-reinforced polymer pipe as claimed in claim 1, wherein the at least one raised feature comprises a plurality of raised features.

8. A fibre-reinforced polymer pipe as claimed in claim 7, wherein the plurality of raised features comprises at least two different raised features.

9. A fibre-reinforced polymer pipe as claimed in claim 1, wherein the non-reinforced polymer of the at least one raised feature includes one or more non-fibre material additives.

10. The fibre-reinforced polymer pipe as claimed in claim 1, wherein the fibre-reinforced polymer pipe is a fluid transfer conduit.

11. A fibre-reinforced polymer pipe as claimed in claim 7, wherein the plurality of raised features are arranged across the cylindrical surface of the main portion and are spaced apart by a spacing distance.

12. A fibre-reinforced polymer pipe as claimed in claim 1, wherein the at least one raised feature extends along the central axis.

13. A fibre-reinforced polymer pipe as claimed in claim 1, wherein the at least one raised feature extends around the central axis.

14. A fibre-reinforced polymer pipe as claimed in claim 1, wherein the at least one raised feature extends in a helix around the central axis.

* * * * *